D. C. Watson,
Harness Trimmings,
No. 64,174.     Patented Apr. 23, 1867.

Witnesses:
F. M. Stokes
J. F. Aause

Inventor:
David C Watson

United States Patent Office.

DAVID C. WATSON, OF MANCHESTER, NEW HAMPSHIRE.

*Letters Patent No. 64,174, dated April 23, 1867.*

---

CHECK-REIN HOLDER.

---

*The Schedule referred to in these Letters Patent and making part of the same.*

---

TO ALL WHOM IT MAY CONCERN:

Be it known that I, DAVID C. WATSON, of Manchester, Hillsboro county, New Hampshire, have invented a new and useful Improvement in Check-Rein Hooks, which prevents the check-rein from becoming unhooked by the horse throwing up his head; and I do hereby declare that the following is a full, clear, and exact description of the construction and operation of the same, reference being had to the annexed drawings, making a part of this specification, in which—

Figure 1:
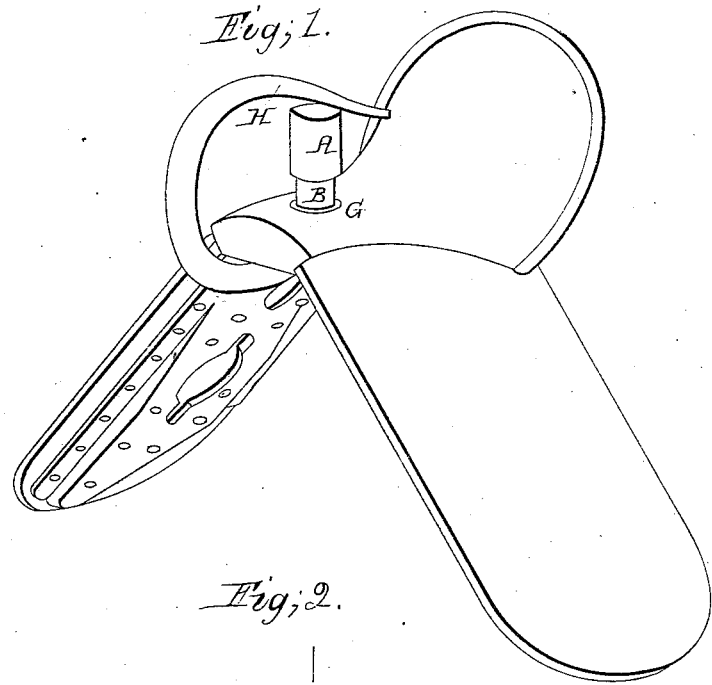

Figure 1 is a perspective view of the saddle check-rein hook and check-rein hook attachment.

Figure 2:
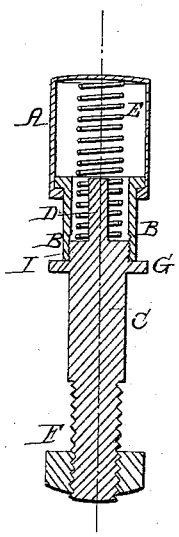

Figure 2, a cross-section of the attachment.

To enable others skilled in the art to make and use my invention, I will proceed to describe its construction and operation.

It is applicable to any ordinary harness-pad or saddle, also to any ordinary check-rein hook. The object of my invention is to secure the check-rein in the hook.

H represents the check-hook as secured to the pad or saddle by the stem C of the attachment by passing through the pad or saddle, thence through the hook, the whole secured underneath by the nut F as by the ordinary bolt and nut in the common manner. On the stem C is screwed a tube, B, at I. The upper end of tube B has a flange at top, extending outward. A is a larger tube, above tube B, and has a flange extending on the inside; the object of the flanges to be to prevent the tube A from separating from the tube B. Tube A has a cap or cover. Around the pin D, of stem C, is a spiral spring, E, which presses against the cap or cover of tube A, keeping the tubes extended, and entirely closing up the check-rein hook. When it is desired to allow the check-rein to enter the hook the cap or tube A is pressed down sufficiently to let the rein in the hook. When relieved from pressure the spiral spring E forces the top of the cap or tube A against the hook H, which secures the check-rein in the hook.

What I claim as my invention, and desire to secure by Letters Patent, is—

The mode herein described to secure check-reins in the hook, as shown by stem C, pin D, tube B, tube A, and spring E, which may be made of wire or rubber.

DAVID C. WATSON.

Witnesses:
    F. U. STOKES,
    F. F. GAUSE.